(12) United States Patent
Tsarev

(10) Patent No.: US 7,092,139 B2
(45) Date of Patent: Aug. 15, 2006

(54) ACOUSTO-OPTICAL VARIABLE FILTER

(76) Inventor: Andrei Vladimirovich Tsarev, P.O.Box 662, Novosibirsk, 630117 (RU)

( * ) Notice: Subject to any disclaimer, the term of this patent is extended or adjusted under 35 U.S.C. 154(b) by 663 days.

(21) Appl. No.: 10/343,188

(22) PCT Filed: Apr. 17, 2001

(86) PCT No.: PCT/RU01/00160

§ 371 (c)(1),
(2), (4) Date: Jan. 27, 2003

(87) PCT Pub. No.: WO02/12953

PCT Pub. Date: Feb. 14, 2002

(65) Prior Publication Data

US 2005/0248826 A1    Nov. 10, 2005

(30) Foreign Application Priority Data

Aug. 4, 2000    (RU) .............................. 2000121145

(51) Int. Cl.
*G02F 1/11* (2006.01)

(52) U.S. Cl. ........................................ 359/285; 385/47
(58) Field of Classification Search ................ 359/305, 359/311, 285, 287, 312; 385/7
See application file for complete search history.

(56) References Cited

OTHER PUBLICATIONS

"Integrated Acoustooptic Tunable Filters Using Weighted Coupling", Kar-Roy et al, IEEE Journal of Quantum Electronics, vol. 3, No. 7, Jul. 1994.
"Thin-Film Tunable Optical Filtering Using Anisotropic and Noncollinear Acoustooptic Interaction in LiNbO3 Waveguides", Kim, IEEE Journal of Quantum Electronics, vol. QE-15, No. 7, Jul. 1979.

*Primary Examiner*—Timothy Thompson
*Assistant Examiner*—Jerry Fang
(74) *Attorney, Agent, or Firm*—Allen, Dyer, Doppelt, Milbrath & Gilchrist, P.A.

(57) ABSTRACT

An acousto-optical tunable filter, comprising planar optical waveguide (2) for propagation of light beam (14), and arranged sequentially along the path of the light radiation: a means for forming a light beam, transducer (16) of acoustic waves suited to generate acoustic wave (15) that is capable of interacting with the beam light waves and cause their diffraction within a predetermined wavelength range, and a means for selecting the diffracted portion of the light beam. The light beam forming means and selecting means are implemented in the form of stripe waveguides (3) and (4–7) respectively disposed in the plane of the planar waveguide and each provided with a set of unit reflectors (10) and (11) that overlap an aperture of corresponding stripe waveguide (3), the relative position and inclination angle of which reflectors being selected to maintain phase difference at the operating radiation wavelength for any pair of beams (13) reflected from different unit reflectors (10), which value essentially is multiple of $2\pi$.

10 Claims, 5 Drawing Sheets ated along the light radiation path: a light beam forming means, acoustic wave transducer suited to generate an acoustic wave that is capable of interacting with the light beam waves and causing their diffraction within a predetermined wavelength range, and a means for selecting the diffracted light beam portion; according to the invention

ACOUSTO-OPTICAL VARIABLE FILTER

FIELD OF THE INVENTION

The invention relates to optics, in particular an acousto-optical tunable filter.

PRIOR ART

Known is a device—an integrated acousto-optical tunable filter using weighted coupling (Arijuin Kar-Roy and Chen S. Tsai, Integrated acoustooptic tunable filters using weighted coupling, IEEE J. Quantum Electronics, 1994, vol. 30, No. 7, pp. 1574–1586), wherein a predetermined optical spectrum wavelength is filtered by acousto-optical (AO) conversion on a surface acoustic wave (SAW) of guided optical modes of different polarization that propagate in an optical waveguide collinearly with the SAW. The filtered light wavelength is tuned by changing a SAW frequency, which frequency is selected to fulfil the conditions of phase synchronism between the interacting waves. The incident and SAW-diffracted optical modes are separated with a cross polarizer that transmits only one of the predetermined polarization waves. Using the additional weighting of the coupling factor of the interacting waves along the direction of their propagation; the filter passband sidelobe level can be lowered to −24.4 dB.

Said device is characterized with an insufficiently narrow passband, the passband width being limited by the optical anisotropy value and the interaction length, and cannot be diminished without a significant increase of the device dimensions.

Known is also an acousto-optical tunable filter based on the anisotropic noncollinear acousto-optic interaction in thin-film waveguides made of LiNbO$_3$ (Bumman Kim, and Chen S. Tsai. Thin Film Tunable Optical Filtering Using Anisotropic and Noncollinear Acoustooptic Interaction in Waveguides, IEEE Journal of Quantum Electronics, Vol. QE-15, No. 7, Jul. 1979, pp. 642–647), comprising a planar optical waveguide for propagating a light beam, and the following means disposed sequentially along the radiation path: a light beam forming means, acoustic wave transducer suited to generate an acoustic wave that is capable of interacting with the beam light waves and causing their diffraction within a predetermined wavelength range, and a means for selecting the light beam diffracted portion, wherein a predetermined optical spectrum wavelength is filtered with an acousto-optical cell by noncollinear diffraction on SAW of the guided optical modes that have different polarization and propagate in a planar optical waveguide. The incident and SAW-diffracted optical modes are separated in an angular space using a selecting means that consists of a focusing element (lens). For the reason that the interacting modes have different propagation directions, the lens performs Fourier transform of the angular spectrum and chooses, spatially, the diffracted beam on a predetermined light wavelength. The tuning of acousto-optical filter passband is done by varying the SAW frequency that propagates in an acousto-optical cell. Spectral resolution of the device is proportional to the light wavelengths and SAW ratio, and is inversely proportional to the optical beam aperture created using the forming element; in this case it is a prismatic coupling element that serves to launch a broad optical beam into the planar waveguide. The acousto-optical cell includes a wave-guiding medium, wherein the optical and acoustic waves can propagate and interact, and also includes an acoustic wave transducer. The use of several phased transducers in an acoustic cell to excite a SAW allows expansion of the acousto-optical interaction band and, consequently, enhance the light wavelength tuning region.

Said device is also characterized with an insufficiently narrow passband whose width is determined by a value of the optical beam aperture in the region of interaction with SAW, and said passband cannot be increased without a significant increase in the device dimensions and without making its manufacture more difficult. It should be noted that creation of a broad (over 1–2 cm) and homogeneous optical beam to be propagated in a planar optical waveguide is an extremely difficult scientific-engineering task that has not yet been accomplished satisfactorily.

SUMMARY OF THE INVENTION

The invention's basic object is development of an acousto-optical tunable filter having minimal dimensions and a narrow passband.

Said object is to be attained as follows:

in an acousto-optical tunable filter containing a planar optical waveguide to propagate a light beam, and the following means sequentially arranged along the light radiation path: a light beam forming means, acoustic wave transducer suited to generate an acoustic wave that is capable of interacting with the light beam waves and causing their diffraction within a predetermined wavelength range, and a means for selecting the diffracted light beam portion; according to the invention at least one of the light beam forming means and selecting means is implemented in the form of at least one stripe waveguide located in the planar waveguide plane, within said waveguide itself or in the vicinity thereof, and in the form of a multiple unit reflectors that overlap the stripe waveguide aperture and whose relative position and inclination angle are selected to maintain the phase difference on the operating radiation wavelength for any pair of the beams reflected from different unit reflectors, which value is essentially multiple of 2π. Here π=3.14159 . . . is the universal constant.

For ensuring a better filtration of the optical radiation and smaller dimensions of the device, both the forming means and selecting means are advantageously implemented in the form of stripe waveguides, and the unit reflectors of the beam forming means' stripe waveguide must be inclined in the direction that is opposite to inclination of the selecting means' reflectors.

For ensuring the simultaneous filtration of several frequency channels (the drop-function), the selecting means is advantageously implemented as having a plurality of analogous stripe waveguides, in which waveguides the arrangement and inclination angle of their unit reflectors are selected in view of the particular operating wavelength, intrinsic only to a given stripe waveguide, that is different from that of other stripe waveguides. To facilitate further discussion, a stripe waveguide of the selecting means with the corresponding unit reflectors hereinafter is referred to as a selecting element, and a stripe waveguide with its unit reflectors of the beam forming means will be referred to as a forming element.

For the purpose of through-passage of a wideband optical signal (through-pass function through), the last in ray path stripe waveguide is advantageously implemented as being identical to the beam forming means' stripe waveguide.

It is noted that through-pass of a wideband optical signal (the through function) is carried out for all wavelengths, exclusive of those that were deflected with an acousto-optical cell. A portion of the deflected light beams, on predetermined wavelengths, will be filtered and re-directed by the selecting means consisting of one or more selecting elements. However, it desirable that all remaining (non-filtered) wavelengths will be enabled to pass through the device. For that purpose, an acousto-optical filter is suitably provided with an additional acoustic wave transducer suited to generate the acoustic wave directed against that of the main transducer and capable of interacting with the light waves of the beam within the space between the last and next to last stripe waveguides of the selecting means.

To ensure the maximal expanding of the optical beam, which expanding will cause minimization of the device size for a predetermined passband linewidth, the unit reflectors are advantageously inclined at the angle of about 45° with respect to axis of a corresponding stripe waveguide.

To ensure the independent tuning of wavelength the filtered radiation of different optical channels by thermo-optical effect, it is advantageous to provide—along at least one stripe waveguide—an electrode whose ends are connected to a controlled direct or alternating current source.

To ensure the independent tuning of wavelength of the filtered radiation of different optical channels by the electro-optical effect, it is advantageous to provide-along at least one stripe waveguide-a pair of electrodes whose ends are connected to a controlled direct current source.

By selecting the optimum value of reflectance, position and inclination angle of each of the unit reflectors of the forming and/or selecting elements, the transmission line shape and envelope thereof in the spectral interval in the tuning band of a tunable optical filter and in its suppression band can be corrected. For example, for the purpose to expand the suppression band of an acousto-optical tunable filter, it is advantageous that the unit reflectors will be spaced at different intervals from one another; and to ensure an essential suppression (more than 20–30 dB) of sidelobes in the filter passband, it is advantageous that the unit reflectors will have a different reflectance whose value decreases from the middle portion of a stripe waveguide to its ends.

BRIEF DESCRIPTION OF DRAWINGS

The invention is further discussed by description of its particular embodiments in conjunction with accompanying drawings, wherein.

BEST MODES OF EMBODIMENT OF THE INVENTION

Figure 1:
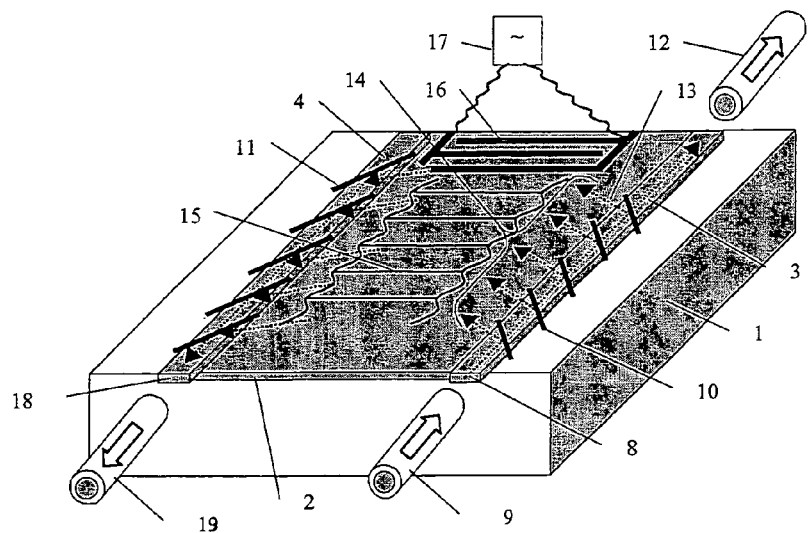
FIG. 1 shows a schematic diagram of an acousto-optical tunable filter having a stripe waveguide arranged in a planar waveguide according to the invention.

A thin layer, several micrometers thick and having refractive index that is greater than that of the environments (substrate and ambient upper layer of, in this case, air), is implemented upon solid-state substrate 1 (FIG. 1-3), or thereunder (the case of so called imbedded waveguide). Said layer is planar optical waveguide 2, i.e. a light beam can propagate within said layer with very low losses (less than 1 dB/cm). The number of the guided (waveguiding) waves (modes) supported by this structure, and the spatial distribution of their optical fields are determined by the profile of change of refractive index in depth.

In planar optical waveguide 2 (FIG. 1), or near it (FIGS. 2, 3), stripe optical waveguides 3–7 are implemented. A stripe optical waveguide has an increased refractive index value not only in depth, but also in the transverse direction of the structure, i.e. said waveguide is a local region upon or under the solid-state surface in the form of a thin stripe having thickness of several to tens microns, and having a refractive index value greater than that of its environments. Thus said waveguide can maintain propagation of a narrow and non-divergent optical beam along its axis in the region of an increased refractive index value. The stripe and planar waveguides can be manufactured using the following techniques: diffusion of metals, proton exchange from salt melts, sputtering of the substances that have a greater refractive index than that of a substrate, epitaxy from gaseous or liquid phase, modification of the surface layer properties by radiation, e.g. by electrons and/or photons. Stripe optical waveguide 3 performs the function of the beam-forming element, and through its polished edge-input 8—an optical beam, that can have different optical spectrum wavelengths, is inputted. The light into stripe optical waveguide 3 can be inputted by various methods, e.g. by fiber-to-strip optic waveguide 9 coupling, by focusing the optical radiation onto the waveguide structure edge, etc.

Each of stripe optical waveguides 3 and 4–7 is provided with a plurality of inclined unit linear optical reflectors 10 and 11, respectively, which reflectors overlap the aperture of stripe optical waveguides 3 and 4–7. Stripe waveguides 4–7 further perform the function of a means for selecting a portion of the light beam. A light beam passes through the forming means and is outputted, partially, through fiber-optic waveguide 12 and can be used to monitor the input signal level (the out-function). But, to provide the optimal device structure, a greater portion of the input beam energy transits into a planar optical waveguide in the form of coherent light beams 13 that form slightly diverging expanded beam 14.

When stripe optical waveguide 3 is implemented in the immediate vicinity—at distance "a"—from planar optical waveguide 2 (FIGS. 2, 3), reflected beams 13 are tunnelled through region "a" that separates them and has a lower refractive index. For the purpose to diminish the optical losses of the device, width of said region must be sufficiently great so that the incident optical fields of modes of stripe waveguide 3 would not reach planar waveguide 2 (i.e. the radiation attenuation must be prevented). On the other hand, said distance must be sufficiently small to facilitate tunnelling of a waveguiding mode therethrough. In this aspect, the trade-off is the value of separating region "a " that is equal, in an order of magnitude, to width of stripe optical waveguide 3 itself, i.e. about 5–20 μm. When stripe optical waveguide 3 is implemented directly on the planar optical waveguide (see FIG. 1), the reflected light beams simply transit from one waveguide to another, thereby intersecting the separating boundary therebetween with negligible losses.

Said optical beam further passes through the region wherein acoustic wave 15 propagates, which wave is generated by acoustic wave source 16. One or more phased interdigital transducers (IDT), being a comb of electrodes connected to high-frequency source 17 of alternating electrical field, is usually used as source 16 of acoustic waves. Transducer 16, using the piezoelectric effect, excites the surface acoustic wave (SAW) that propagates in the subsurface region occupied by optical waveguide 2 and is able to interact efficiently with the guided optical waves. A portion of expanded beam 14—on the operating light wavelength that satisfy the Bragg phase synchronism conditions—is diffracted onto the SAW and changes its propagation direction. Further, the diffracted optical beam enters, from planar optical waveguide 2, a selecting means implemented in the form of stripe optical waveguide 4 and unit reflectors 11, then said beam is outputted from the device via output 18, that is the polished end face (edge) of waveguide 4, into fiber-optic waveguide 19.

Figure 2:
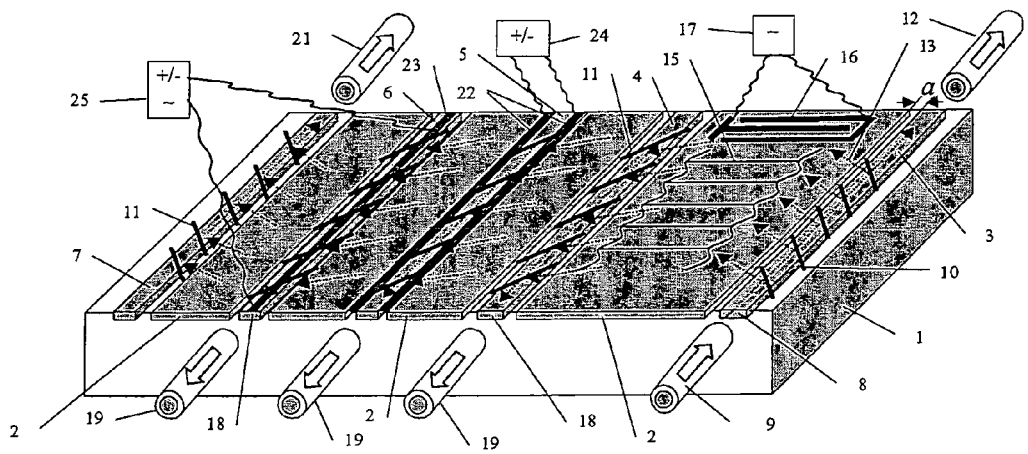
FIG. 2 shows a schematic diagram of an acousto-optical tunable filter having a plurality of stripe waveguides in the vicinity of a planar waveguide, and additional control electrodes, according to the invention.
Figure 3:
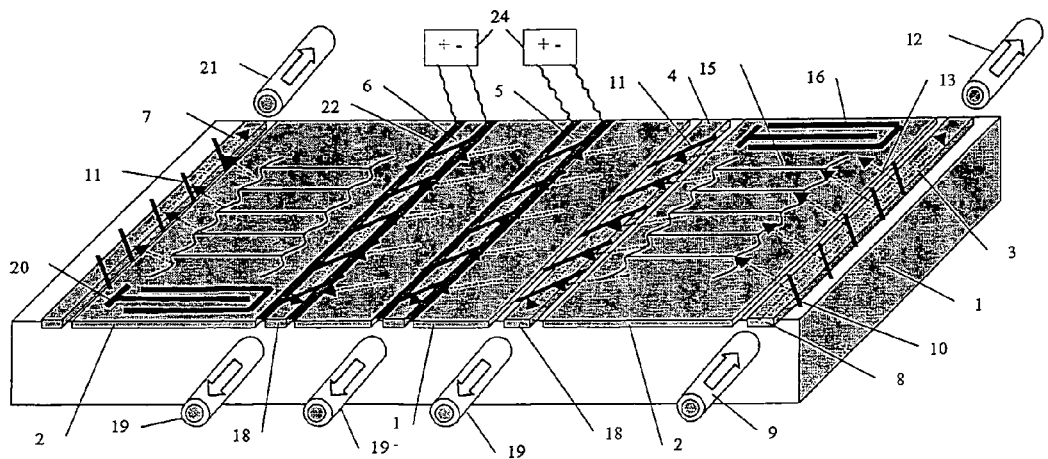
FIG. 3 shows a schematic diagram of an acousto-optical tunable filter having a plurality of stripe waveguides in the vicinity of a planar waveguide, additional control electrodes and additional transducer of acoustic waves, according to the invention.

As discussed below, relative position and angle of inclination of unit reflectors 11 are selected to maintain the phase difference on the operating radiation wavelength for any pair of the beams reflected from different unit reflectors 11, essentially being multiple of $2\pi$. At that, interference of the beams reflected from different unit reflectors 11 will result in that the majority of optical waves is summed in phase only on the operating light wavelength, and the filter will transmit only a predetermined light wavelength. On all other light wavelengths, the condition of the constructive interference will not be complied with, and passage of a signal will decrease by a number of orders of magnitude (signal suppression). Tuning of the filter's operating wavelength is carried out based on the acousto-optical and/or electro-optical effects, as well as the thermo-optical or electrostriction effects (FIGS. 1–3).

In the acousto-optical tunable filter shown in FIG. 1, the selecting means comprises only one stripe optical waveguide 4 and one acoustic wave transducer 16. But the functional capabilities of the device are essentially expanded, if a number of optical waveguides 4–7, each having its own set of unit reflectors 11 (FIG. 2), is comprised by the selecting means, and also if additional transducer 20 (FIG. 3) of acoustic waves (FIG. 3) is used. Thus, the device acquires the property of a multi-channel narrow-band tunable optical filter. Further, depending on the relative orientation of unit reflectors 11, the device provides execution of two important functions. When both the forming means and selecting means are implemented in the form of stripe waveguides, and unit reflectors 10 of stripe waveguide 3 of the beam forming means are inclined in the direction opposite to inclination of reflectors 11 of the selecting means, then the narrow-band filtration of the incident radiation (the drop function) is performed. When the last-on-the-radiation-path stripe waveguide 7 having unit reflectors 11 is implemented identically to stripe waveguide 3 of the beam forming means, then the through-passage of a wide-band optical signal (through-passage function) to the last stripe waveguide 7 is carried out, and a signal can be outputted using fiber-optic waveguide 21.

For additional electronic control of the operating frequency of each of the optical channels: in the immediate vicinity of stripe optical waveguides 3–7 of the forming and/or selecting elements—electrodes 22 and 23 in the form of conductive material stripes are implemented. When an electric field from controlled source 24 of direct current is applied to adjacent electrodes 22, a local change in refractive index in the vicinity of the stripe waveguides, owing to the electro-optical or electrostriction effects, occurs and causes a wave phase change for the passing optical beams and shifts the optical filter's operating wavelength. The similar change of refractive index can be provided by the thermo-optical effect by applying the direct or alternating electric field from corresponding current source 25 to ends of single electrode 23 (FIG. 2). The current flow will cause heating of electrode 23, create a local change in the refractive index in the region of waveguide 5, thus shifting the optical filter's operating wavelength.

The acousto-optical tunable filter according to the invention operates as follows. A narrow optical beam is inputted through input 8 into stripe optical waveguide 3 of the forming element (FIG. 1-3), and on each of unit reflectors 10 it is divided into two beams. One of the beams (having a significantly lesser intensity) is reflected and transits from stripe optical waveguide 3 into planar optical waveguide 2, the other beam (having slightly lesser intensity as compared with the incident one) passes through stripe optical waveguide 3 to next unit reflector 10, whereon it is divided again into two beams, etc. All reflected beams 13 are summed coherently with consideration for the optical phase shift caused by a delay of the light beam in the interval between adjacent reflectors 10. The resulting light beam 14 has a broad aperture (hundred times exceeding the inputting one) and a low divergence of the outputted optical radiation, which divergence is caused by constancy of the optical wave phase front in the transverse direction of stripe waveguide 3, and also by a strictly predetermined inclination and position of a great number of unit reflectors 10.

Angular spectrum U(p), radiated by the forming element in the waveguide 2 plane, is described as follows. Without prejudice to generality, the transverse distribution of electric field of the guided (waveguiding) mode may be represented as $\exp(-(y/w_o)^2)$, where $w_o$ is effective width of a stripe waveguide, y is transverse coordinate (in the planar waveguide plane). Each reflector 10 is 2 w wide and described by reflectance $R_m$, phase shift $kx_m$, where $x_m$ is coordinate of m-th reflector.

To ensure maximal expanding of the optical beam, the inclination angle of the unit reflectors is selected being at 45° with respect to axis of the stripe waveguide, and the reflectors themselves are spaced strictly periodically at spacing d:

$$x_m = dm, \quad m=1, 2, 3, \ldots M. \tag{1}$$

Then U(p) may be obtained as follows:

$$U(p) = \sum_{m=1}^{M} u_o(p)\Psi_m \exp(-ikpx_m), \quad (2)$$

$$u_o(p) = C\int_{-w}^{w} \exp(-ikpx - (x/w_o)^2)\,dx, \quad (3)$$

where $$\Psi_m = r_m \prod_{m=1}^{M-1} t_m^m,\ r_m = (R_m)^{1/2},\ t_m = (T_m)^{1/2},\ T_m = 1 - bR_m,$$

C is normalization constant that is determined under the condition that energy of all spectral components is equal to effluence of energy from the stripe waveguide on all unit reflectors, $\Psi_m$ is weighting function or transformation factor of the optical guided mode from the stripe optical waveguide into the planar optical waveguide on m-th reflector, $r_m$ and $R_m$ are reflectances on m-th unit reflector in respect of amplitude and intensity, $t_m$ and $T_m$ are transmission coefficients of m-th unit reflector in respect of amplitude and intensity, p—is the sine of the observation angle with respect to the axis that corresponds to the direction of the beam reflected from a unit reflector, $u_o(p)$ is angular spectrum radiated by a unit reflector, b is the coefficient that takes into account the energy losses that occur during reflection, e.g. due to transformation into other wave types (other polarization, radiation modes, etc.). It may be demonstrated that for $\Psi_m$ the following recurrent formula is valid:

$$\Psi_m^2 = \Psi_{m-1}^2 (I-R_{m-1})R_m/R_{m-1} \quad (4)$$

This permits to determine the relationship existing between $\Psi_m$ and $R_m$. First, the case of the constant reflectance ($R=R_m$) is discussed, and for simplicity, it is assumed that $w/w_0$ is much more than one. Then the following formulas can be derived $$u_o(p)=Cw_o(\pi)^{1/2}\exp(-(kwp/2)^2), \quad (5)$$

$$U(p)=C(\pi)^{1/2}w_0 \exp(-(kwp/2)^2)r(1-t^{(M-1)}\exp(-ikpdM)/(1-t\exp(-ikpd)) \quad (6)$$

Angular distribution of the expanded beam intensity will be represented as follows.

$$I(p)=|U(p)|^2=C^2\pi w_o^2 \exp(-(kwp)^2/2)x$$

$$x[(1-t^{(M-1)})^2+4t^{M-1}\sin^2(kd(1-p)(M-1)/2)/((1\ t)^2+4\ t\sin^2(kd(1-p))] \quad (7)$$

Figure 4:
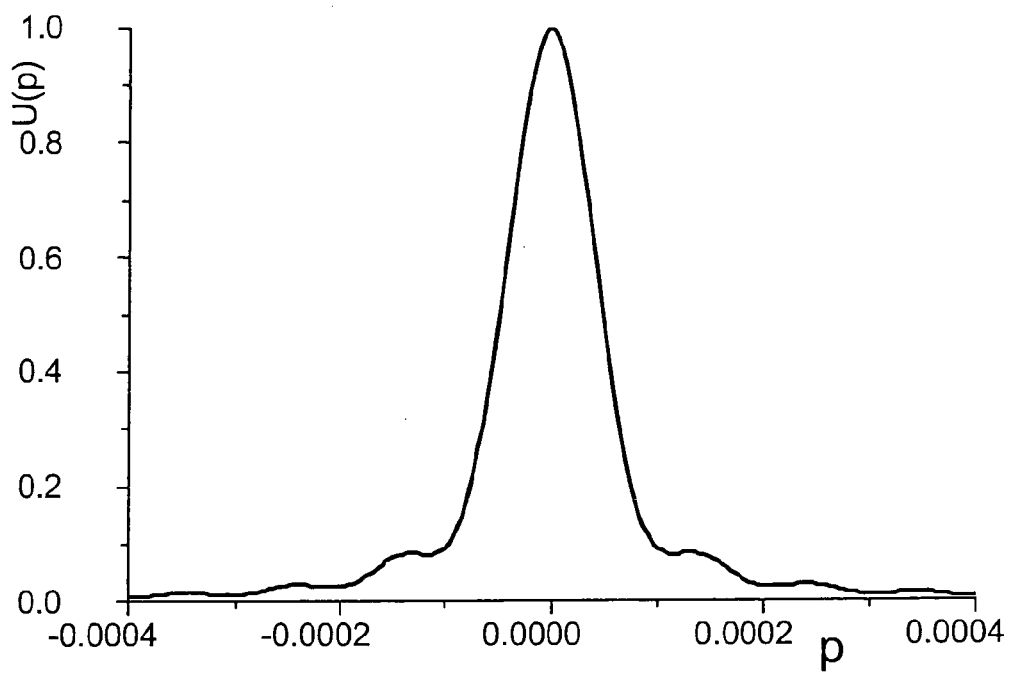
FIG. 4 shows variation of intensity of radiation of a forming element depending on direction of the reflected beam in the planar waveguide plane.

The radiated spectrum of the beam-forming element when $\lambda_0=1.54$ μm, is shown in FIG. 4. Said spectrum is a very narrow peak having the following width:

$$\Delta p = \lambda_0/(N\,d\,M) \quad (8)$$

FIG. 4 shows that the peak width has the magnitude in the order of 0.0001 radian. In calculation it was assumed that N=2.2, unit reflectors have constant reflectance R=0.002 and are arranged strictly periodically at spacing of d=7μm, number of reflectors being M=1000, total length of the reflectors' structure being dM=0.7 cm, the effective width of a stripe optical waveguide being $w_o=10$ μm.

Appearance of this narrow angular spectrum, may be demonstrated on the basis of equation (8) that comprises two co-factors. First of them $u_o^2(p)$ describes the angular spectrum of a limited light source formed by partial reflection, from a unit reflector, of a guided mode of a stripe optical waveguide. The spectrum has a broad angular distribution about 0.04 radian, with maximum that correspond to a mirror-reflected beam (p=0). The second co-factor describes a narrow linear spectrum with angular divergence (Δp) about 0.0001 radian (FIG. 4) and describes the result of interference effected by different unit reflectors. Position of maxima of the line spectrum is represented as follows:

$$kd(1-p)/2=\pi m_\lambda \quad (9)$$

Where $m_\lambda$ is an interference magnitude (integer). The true angular spectrum (FIG. 4) is the product of these two functions. Thus, owing to the first co-factor, of the entire line spectrum survives only one line (FIG. 4) that corresponds to such interference order ($m_\lambda$), according to which the distribution direction is the nearest to the mirror reflection (p=0) effected from the unit reflectors. In this case $m_\lambda=10$, when $\lambda_0=1.54$ μm.

Thus, arrangement of reflectors is selected according to equation (9) when p=0. This fulfils the condition that at a predetermined wavelength of the optical radiation the direction of propagation of one of the interference ($m_\lambda$) orders and mirror-reflected beams coincide with the accuracy to angular divergence (Δp) of the expanded optical beam that exits from the device. In other words, it means that—the inclination angle and position of the unit reflectors are selected such that at the operating light wavelength the phase difference for the beams reflected from different unit reflectors is essentially multiple of 2π.

Figure 5:
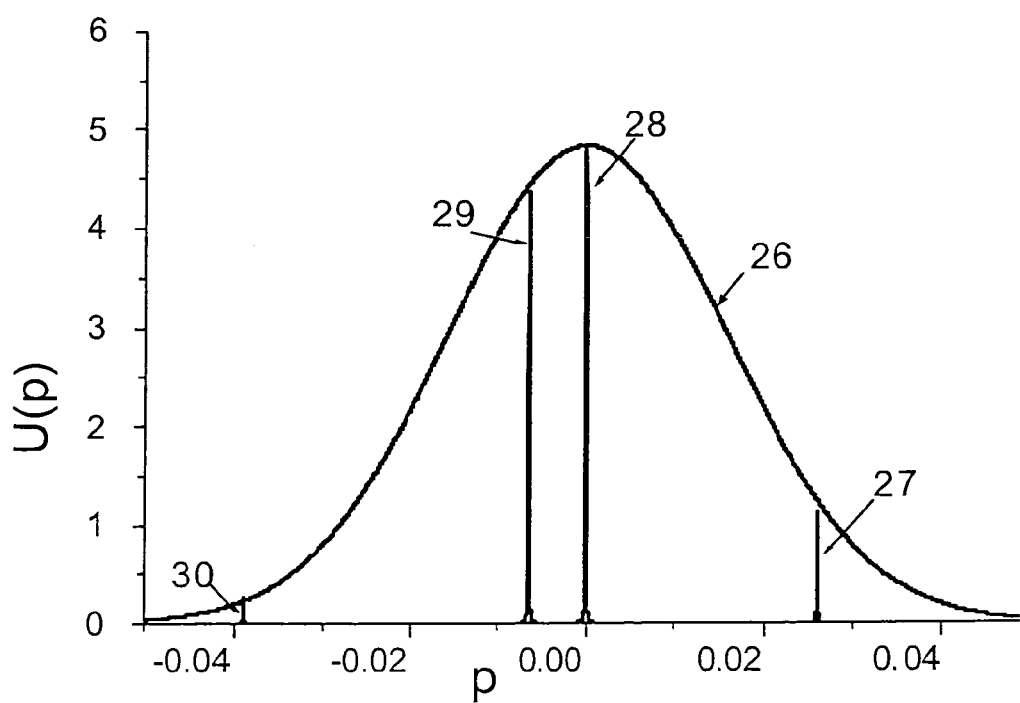
FIG. 5—ditto as in FIG. 4, on different light wavelengths.

Further, according to (9), directional pattern of the expanded beam shifts as a whole (scans) when the light wavelength changes:

$$p=(\lambda_m-\lambda)/\lambda_m \quad (10),$$

where $\lambda_m=dN/m_\lambda$. FIG. 5 shows plot of function $u_o^2(p)$ (see curve 26) and also the angular spectrum radiated by the forming element when $m_\lambda=10$, for various wavelengths (27–$\lambda_0=1.50$ μm, 28–$\lambda_0=1.54$ μm, 29–$\lambda_0=1.55$ μm, 30–$\lambda_0=1.60$ μm). It is observed that as light wavelength varies, the directional pattern shifts according to equation (11), and amplitude of the spectral components changed proportionally with $u_o^2(p)$.

Operation of the selecting element of the selecting means is similar to operation of the forming element of the forming means, if the light propagation direction is inversed (FIG. 1). I.e., the guided optical mode field of stripe waveguide 4 is formed as the result of interference of a great number of coherent light beams that passed from planar optical waveguide 2 into stripe waveguide 4 as a result of reflection on each of unit reflectors 11. It may be demonstrated that angular spectrum of the optical waves, that are able to reach output 18, is described by equations (4–10) provided with respect to tie forming optical element.

Angle of deviation of diffracted beam θ depends on optical radiation wavelength $\lambda_0$ and SAW frequency (f)

$$\theta=\theta_1+\theta_2,$$

$$\sin\theta_1=\lambda_0(2\Lambda^*N_1)^*[1+(\Lambda/\lambda_0)^2(N_1^2-N_2^2)]$$

$$\sin\theta_2=\lambda_0(2\Lambda^*N_1)^*[1-(\Lambda/\lambda_0)^2(N_1^2-N_2^2)] \quad (11)$$

Where Λ is SAW wavelength, Λ=v/f, v and f are velocity and frequency of SAW, $N_1$, $N_2$, $\theta_1$ and $\theta_2$ are effective refractive indices and Bragg angles for the incident and diffracted waves, respectively. Equation (11) is derived from the condition of fulfilling the phase synchronism (Bragg conditions) for three interacting waves (two optical and one acoustic waves). Bragg angles are counted from the acoustic wave phase front. For simplicity, the case of isotropic diffraction (without change of a wave type) is further discussed, assuming that $N=N_1,=N_2$, then:

$$\theta=2\theta_B,$$

where $\theta_B=\arcsin(\lambda_0/(2/\Lambda N))$, (12).

To provide interaction of the acoustic wave with the beam of light waves, the latter must propagate at the appropriate Bragg angles ($\theta_1$ and $\theta_2$). Relative position and inclination angle of unit reflectors 10, 11, of both the forming means and the selecting means are selected to maintain the phase difference on the operating radiation wavelength for any pair of beams reflected from different unit reflectors, which length is essentially multiple of $2\pi$. In terms of physics, this corresponds to the case when the propagation directions of one of orders of interference from different unit reflectors coincide with the direction determined by the mirror-reflected beams that transit from the corresponding stripe optical waveguides into the planar optical waveguide, and vice versa.

By varying the position and inclination angle, reflectance R and M number of reflectors, the amplitude and linewidth of filtered signal, and sidelobe level and signal suppression band outside the acousto-optical tunable filter passband can be changed. Reflectors 10, 11 can have the form of local regions developed as narrow (in general, about 0.2 μm) stripes having other optical properties, for example, due to the proton exchange, ion implantation, etc., and also developed as grooves or steps (about 1–100 nm high) made of the same or other material on the optical waveguide surface. Reflectance of a unit reflector is in general 0.005÷0.0001 and can be controlled by optimum selection of a manufacture process and reflector geometry. Number of reflectors must be sufficiently great (in general, product R*M is over 2, i.e. M is approximately 500÷1000), so that good collimating properties (a narrow directivity and strong suppression of sidelobes in angular space) and a high efficiency of transformation from a narrow beam into a broad one, and vice versa, could be achieved. The distance between the unit reflectors is usually comparable with the width of an optical waveguide (about 5÷20 μm).

Figure 6:
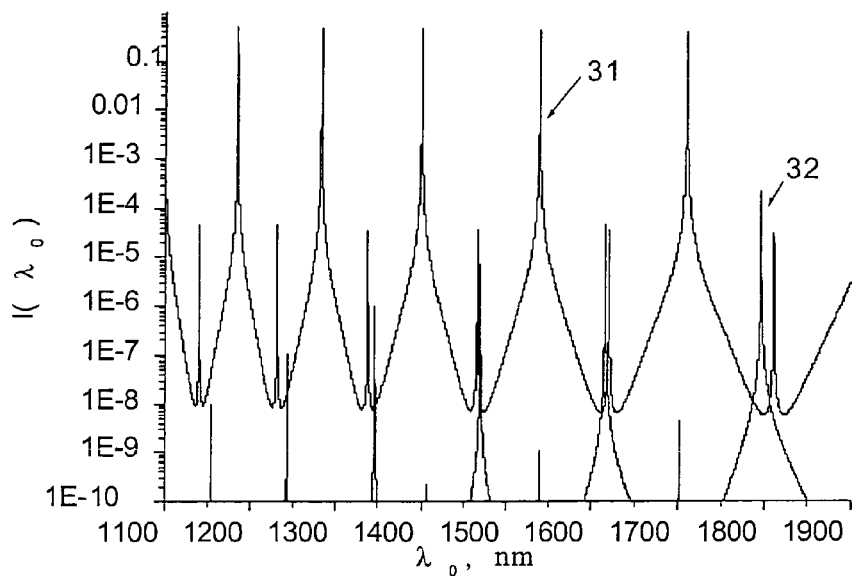
FIG. 6 shows variation of intensity of transmission of an acousto-optical tunable filter $I(\lambda_0)$, for different inclination angles of unit reflectors.

Thus, the light beam, delivered via input 8 of stripe optical waveguide 3 and comprising different optical spectrum wavelengths, passes through the forming optical element and transits to planar optical waveguide 2 as a set of coherent light beams 13, whose directivity pattern depends on the optical radiation wavelength according to equation (10) and has a very narrow width (about 0.0001 radian). Further, a portion of the optical beam that passed through AO cell and a light wavelength that satisfies the Bragg synchronism conditions, is diffracted on SAW 15 and deflected at angle $2\theta_2$ towards the selecting means' selecting element that transmits only that portion of the optical radiation that has a strictly determined wavelength and propagation direction. I.e., the selecting means performs an addition selection across the optical radiation wavelength, which radiation has passed through the region with the acoustic wave. The filtering properties of the forming and selecting elements can be described by convolution of their spectral functions, which convolution, in the case when the elements are structurally identical, has the following form:

$$I(\lambda_0)=C_1\int I(p)I(2\theta_B-\theta_0-p)dp, \quad (13)$$

where $C_1$ is numerical factor (less than and about one) that takes into account the presence of free intervals between the unit reflectors. It follows from expression (13) that for the purpose to avoid the direct passage of a signal when SAW is not present (when $\theta_B=0$), the relative angle of inclination of the mirror-reflected beams of the forming and selecting elements ($\theta_0$) must be greater than the diffraction divergence angle ($\lambda_0/(Nw_o)$) of the light beam reflected from a unit reflector. In terms of geometry, this corresponds to the case when in a planar optical waveguide between the mirror-reflected beams, if they were directed into stripe optical waveguides 3 and 4 via polished end faces 8 and 18, respectively, angle $180°-\theta_0$ would be formed. This condition is shown in FIG. 6, wherein the pass spectra of an acousto-optical filter $I(\lambda_0)$ for two typical cases are shown. Curve 31 corresponds to the case of $\theta_0=0$, and curve 32 corresponds to the case of $\theta_0=0.1$ (i.e. $\theta_0$ is equal to deviation angle of diffracted light on SAW, with wavelength of 7 μm). It is obvious that when $\theta_0=0$, the device transmits a set of narrow sub-zones that correspond to various interference orders ($m_\lambda$). However, when $\theta_0=0.1$, (i.e. when $\theta_0$ is greater than $\lambda_0/Nw_0 \approx 0.07$), the effective (over 30 dB) suppression of the acousto-optical filter transmission signal is observed. The passband line width $\Delta\lambda_0$ is determined by angular divergence of the radiation directivity pattern ($\Delta p$) and characteristics of scanning of the directivity pattern as the light wavelength changes. Then according to (10) and (12):

$$\Delta\lambda=\lambda_0^2/(N\,d\,M) \quad (14).$$

It follows from equation (14) that a tunable filter according to the invention, dimensions being equal, has the linewidth that is approximately $N/\Delta N$ times narrower than in a standard collinear acousto-optical filter. In the case of lithium niobate substrates having identical size, this provides narrowing of the passband line more than 20 times.

It is noted that an acousto-optical cell has additional selecting properties that are important for operation of the device. I.e. in an AO-interaction only those optical waves participate (i.e. are deflected) that comply with the Bragg synchronism conditions. It is possible to demonstrate that for the case of isotropic diffraction only the light wavelengths are selected that satisfy the following equation:

$$\lambda=\lambda_m(1+\theta_0)/(1+\lambda_m/(2N\Lambda)). \quad (15)$$

This equation demonstrates that at each fixed SAW wavelength $\Lambda$ there will be found a set of such light wavelengths $\lambda$ in the vicinity of $\lambda_m$, for which, simultaneously, the phase synchronism conditions are satisfied and maximally efficient transformation from the forming element's stripe optical waveguide into a planar optical waveguide, efficient diffraction of light on SAW and then the transition of a significant portion of the diffracted radiation at the operating light wavelength into the selecting element's stripe optical waveguide are provided. I.e. this device has the properties of the passband automatic tuning when SAW wavelength varies. It is noted that this filter carries out the synchronous passband tuning for a number of sub-zones at a time. Any of them can be selected as the operating one for a particular type of a tunable filter.

Selection of an operating sub-zone can be done by an external wideband optical filter and/or by the use of only a predetermined wavelength range for transmission of data. For example, for the sub-zone that corresponds to $m_\lambda=10$, the operating wavelengths will be near 1.54 μm. Below that value, all results will relate just to said sub-zone as the most suitable one for the use in fiber-optic communication, for said sub-zone corresponds to the range (1530–1565 nm) that is covered by the optical amplifiers types currently in use. But all above-cited inferences automatically apply also to other wavelength ranges, i.e. this filter is an universal device, for only its technical parameters, e.g. transmission line width (see equation (14)) depend on the light wavelength.

It can be demonstrated that optical width of the light diffraction band on SAW, excited by single interdigital device having aperture L, is described by the following expression:

$$\Delta\lambda_{AO2} \sim 1.8\, \lambda_0\, \Lambda\, \cos(\theta_B)/L \quad (16)$$

Filtering properties of an acousto-optical tunable filter are determined by product of the filtering properties of both an AO cell (equation (16)) and properties of the forming and selecting elements (equation (13)), which are also controlled by the acoustic wave.

Figure 7:
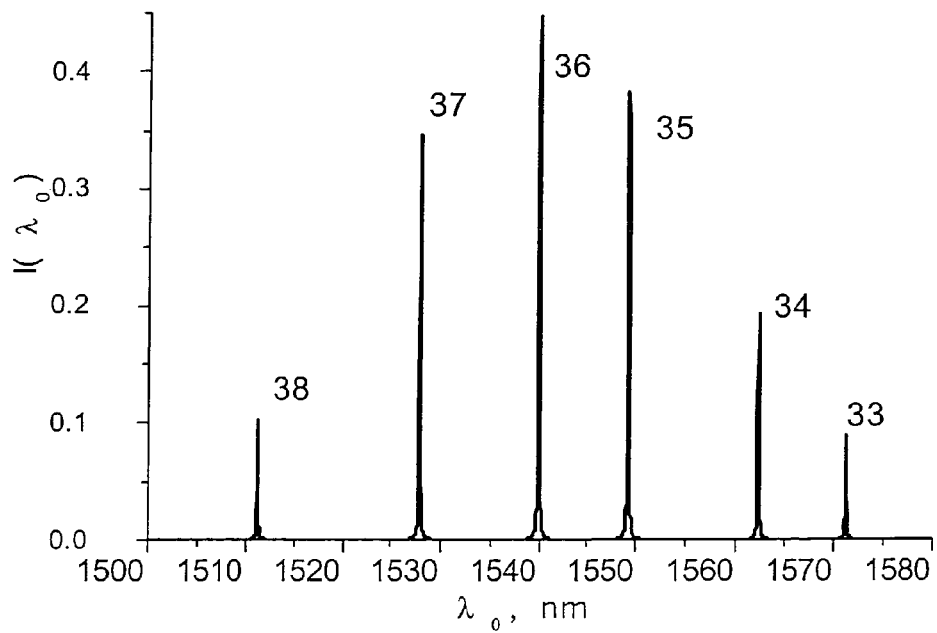
FIG. 7 shows variation of intensity of transmission of an acousto-optical tunable filter for different wavelength of an acoustic wave.
Figure 8:
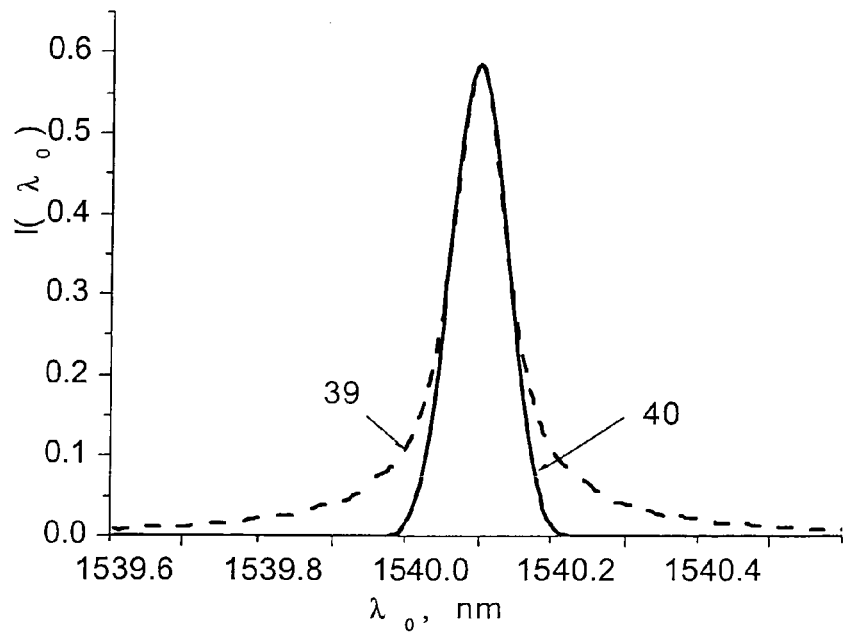
FIG. 8—shows a variation of intensity of transmission of an acousto-optical tunable filter in case of a constant and modified reflectance of unit reflectors.

Example of typical characteristics of lithium niobate acousto-optical tunable filter is shown in FIG. 7 for different SAW wavelengths (33–$\Lambda$=12 μm, 34–$\Lambda$=10 μm, 35–$\Lambda$=8 μm, 36–$\Lambda$=7 μm, 37–$\Lambda$=7 μm) for $m_{80}$=10. For simplicity, all curves are normalized regarding efficiency of light diffraction on SAW, which efficiency is approximately proportionate to radio frequency (RF) power applied to the interdigital device electrodes. It is obvious that when SAW wavelength alters from 5 to 12 μm, the device provides the selective filtration of the optical radiation from 1.511 μm to 1.571 μm, i.e. within the tuning band of 60 nm, that approximately corresponds to the minimal losses of signal occurring in an optic fiber and in existing optical amplifiers. Shape of the filter transmission linewidth is shown in FIG. 8 (curve 39). For calculation, it was assumed that reflectance is constant for all unit reflectors. At the level of 0.5 (or –3dB) it is 0.1 nm wide, which corresponds to 600 tunable channels over the light wavelength. It is noted that there is a moderate expanding of the filter transmission line when the signal suppression level lowers, for example, at level of –10 dB the line is 0.33 nm wide.

Level of the sidelobe maxima of optical elements can be lessened by weighing their transmission coefficients. In our case, for better suppression of parasitic signals outside the filter passband, the unit reflectors are selected as having the variable reflectances whose value is lessened near the beginning and end of the forming and/or selecting element. The reflectance change rule is selected on the basis of the trade-off requirements regarding the filter transmission line width and the sidelobe suppression level. To demonstrate the technical capabilities of the filter shown in FIG. 8 (see curve 40), transmission of an acousto-optical tunable filter is also shown for the case when the weighting function is a limited Gaussian function (17) having weighting constant ($C_2$) that is 5.

$$\Psi(m) = \exp\{-C_2[(2m-M/M]^2\},\; m=1, 2 \ldots M. \quad (17)$$

It is obvious that weighting of the weighting functions or coefficient of transformation of the optical guided mode's field from the stripe optical waveguide into the planar optical waveguide results in an essential improvement of suppression of parasitic signals and, narrowing of the transmission line of the acousto-optical tunable filter when the rejection levels are high. For example, for the case of a variable reflectance from unit reflectors (curve 40) the bandwidth is 0.1 nm at level of –3dB; 0.17 nm at level of –10 dB, and 0.22 nm at level of –20dB, respectively. I.e. the acousto-optical tunable filter provides 270 independent channels at level of –20 dB, or 350 channels at level of –10 dB; suppression of parasitic signals within the tuning band (60 nm) being over 35 dB.

Figure 9:
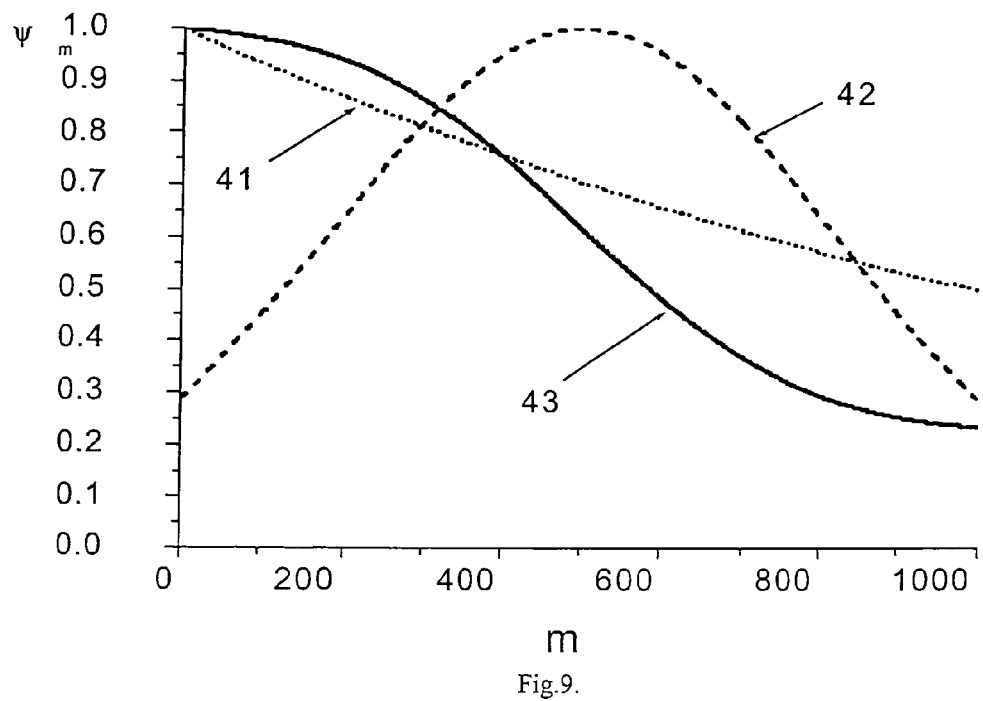
FIG. 9 shows a change in amplitudes of optical fields in the planar and stripe waveguides in the region of arrangement of unit reflectors.
Figure 10:
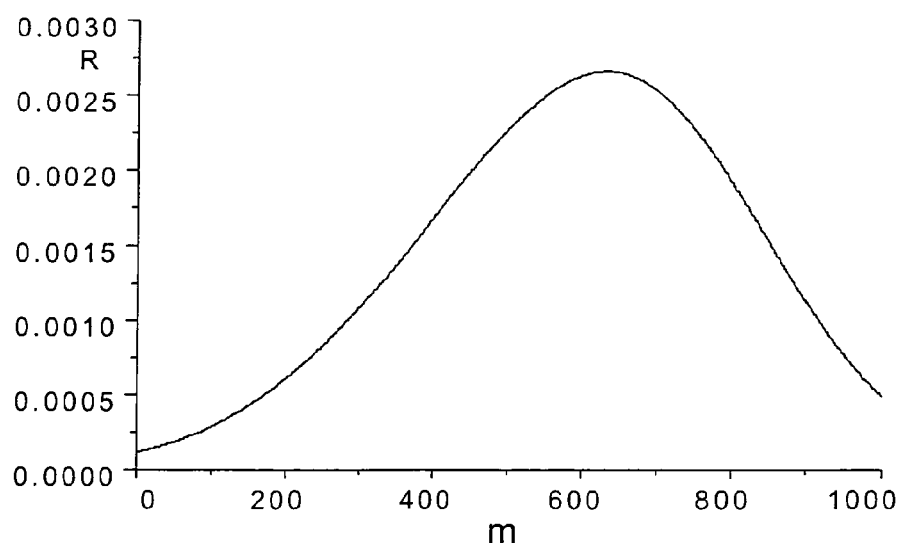
FIG. 10 shows a change in reflectance depending on the series number of a unit reflector.

The type of weighting functions used is shown in FIG. 9. It is noted that the weighting function is equal to the relative value of the optical field amplitude in the planar optical waveguide in the vicinity of location of the corresponding unit reflectors. For the constant reflectance of the unit reflectors, the weighting function has the form of exponential dependence (curve 41). The weighting function in the form of limited Gaussian function with weighting constant of 5 is shown by curve 42. Curve 43 shows a change in a guided optical mode field of the stripe optical waveguide as said mode passes through the unit reflectors having a variable reflectance. FIG. 10 shows the corresponding change in reflectance of the unit reflectors, which change provides a predetermined form of weighting function 42 shown in FIG. 9.

There are possible situations when the use of the external wideband input filter is not desirable, and the required signal suppression band is so great that includes a number of sub-zones at a time. In such case, the unit reflectors of the forming and/or selecting elements are arranged at different intervals from one another. Their position is selected on the basis of the optimization procedures that provide the required signal suppression. For example, their position may be shifted in respect of a periodical pseudo-random arrangement by a value being multiple of spacing ($d_o$) and providing phase difference of 2 π for the light beams that are mirror-reflected from different unit reflectors and transiting from the stripe optical waveguide to the planar optical waveguide. In the case when reflectors are positioned at angle of 45°, it means that value of spacing ($d_o$) is equal to the tunable filter's operating optical radiation light wavelength, which operating wavelength is divided by an efficient refractive index of the corresponding stripe optical waveguide (N). Such arrangement of the reflectors provides the coherent summation of the beams formed from different reflectors, only at the operating optical radiation light wavelength of the tunable filter. At all other light wavelengths, sufficiently distant from the operating one, the field resulted by summation of the beams formed from different reflectors with chaotic delay of phase shift, will be negligibly small.

Design of such type of an acousto-optical tunable filter can be done only numerically in accordance with equations (1)–(4), if equation (1) is replaced with the following equation (18) that takes into account the pseudo-random arrangement of the unit reflectors:

$$x_m = dm + d_o A_m,\; m=1, 2, 3, \ldots M, \quad (18)$$

where $d_o = \lambda_0/N$ is a spacing of the pseudo-random arrangement of reflectors, $\lambda_0$ is the tunable filter's operating optical radiation light wavelength, $A_m$ is a set of integers (0, ±1, ±2, ... ±$M_o$) that change randomly from –$M_o$ to +$M_o$, where $M_o$ is multiplicity of pseudo-random arrangement of reflectors; $M_o$ must be less than $d/d_o$ ratio. The following expression is used as the pseudo-random sequence generator:

$$A_m = \text{Integer}(M_o \sin(C_3 m^2)), \quad (19)$$

Where $C_3$ is a parameter, in this case $C_3$=400.

Figure 11:
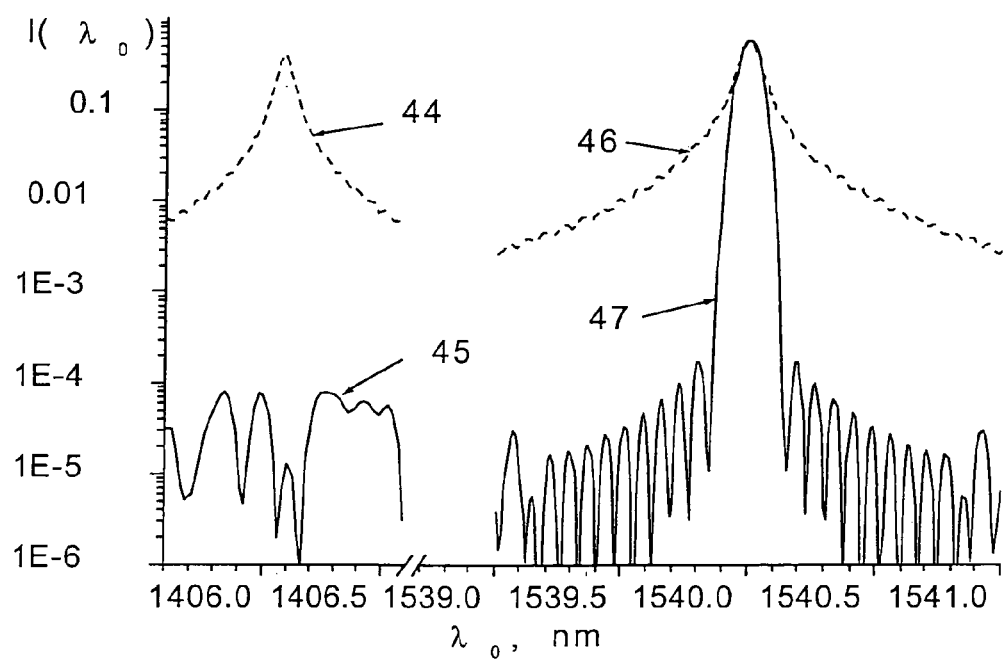
FIG. 11 shows relationship of intensity of transmission of an acousto-optical tunable filter in case of different reflectance and different spacings between unit reflectors.

FIG. 11 shows a transmission line width shape of the acousto-optical tunable filter for the periodic (curves 44 and 46) and pseudo-random (curves 45 and 47) arrangement (with multiplicity of 4) of the inclined reflectors of the forming and selecting elements. Further, curves 44 and 46 correspond to the case of a constant reflectance of the unit reflectors, and curves 45 and 47 correspond to the case of a variable reflectance of the unit reflectors, when the weighting function is a limited Gaussian function (17) with weighing constant of 5.

In the whole range of the light wavelength variation within the filter suppression band, two characteristic intervals near 1.4 μm and 1.54 μm are selected, which intervals correspond to the maximal transmission of the acousto-optical tunable filter, for two interference orders of $m_\lambda=11$ and $m_\lambda=100$, respectively, for the case when SAW wavelength is 7 μm. For better demonstration of the filtering properties of the acousto-optical tunable filter, in FIG. 11 the transmission line shapes are represented in logarithmic scale for $m_\lambda=11$ (curves 44 and 45) and $m_\lambda=10$ (curves 46 and 47). In particular, by comparing curves 46 and 47 it is obvious that an a large increase in parasitic signal suppression is outside the filter passband for the case of a variable reflectance (curve 47) of the unit reflectors, as compared with the case when the reflectance is constant (curve 46).

It is obvious that curves 44 and 46, that correspond to the strictly periodic arrangement of the unit reflectors having spacing of 7 μm, practically do not vary when the sub-zone number (or interference order $m_\lambda$) changes. I.e., as it is mentioned above, to avoid passage of a signal from adjacent sub-zones, it is necessary to use an additional wideband filter and/or to use for transmission of data only a predetermined wavelength range within one sub-zone. But, if the unit reflectors are arranged at different intervals from one another (see curve 45), then the acousto-optical tunable filter will transmit only one fixed light wavelength determined by the SAW wavelength. It is obvious that line of 1406 μm, corresponding to $m_{\lambda=}11$, is suppressed at the level higher than −40 dB, as compared with the operating line of 1540 nm, that corresponds to $m_{\lambda=}10$. Thus, the pseudo-random arrangement of the unit reflectors according to (18) provides the coherent summation of beams formed from different reflectors, only at one light wavelength the nearest to the operating one. At all other light wavelengths, sufficiently distant from the operating one, the field resulting from summation of the beams formed from different reflectors, has a chaotic delay of phase shift and turns out to be negligibly small. It is noted that the level of suppression of the signals outside the filter passband depends on multiplicity of the pseudo-random arrangement of the reflectors and the total value of the filter suppression band value.

It is noted that the acousto-optical filter selecting means can comprise a plurality of stripe waveguides, for example 5 and 6, similar to 4; position and angle of inclination of unit reflectors 11 of each of said waveguides being selected such that they take into account the particular operating wavelength, intrinsic only to a given stripe waveguide, that is different from the operating wavelength of other stripe waveguides. According to expressions (10) and (15), the optical filter operating frequency is determined by the acoustic wave frequency, efficient refractive index of stripe optical waveguides and reflectors' arrangement spacing. Therefore, according to equation (10), said change in wavelengths of the filtered radiation ($\delta\lambda/\lambda=\delta N/N =\delta$ d/d ) can be both constructional, i.e. caused both by a variation in parameters of the stripe waveguides (a change in refractive index $\delta N$) and/or by equivalent change in the unit reflector arrangement spacing ($\delta d$), and indicated when an external electric field is applied. In particular, when an electric field from controlled source 24 of direct current is applied to pair of electrodes 22, a local change in refractive index in the vicinity of stripe waveguide 6 owing to the electro-optical or electrostriction effects appears and causes a phase shift and displaces the optical filter operating wavelength. The similar change in refractive index can be provided by the thermo-optical effect, when the alternating or constant electric field is applied to ends of electrode 23 (FIG. 2) from corresponding current source 25. Current flow causes heating of electrode 23 which results in a local change in the refractive index in the region of waveguide 5, thus resulting in a shift of the optical filter operating wavelength.

Further discussed is the case when the last-in-the-radiation-path stripe waveguide 7 is implemented identically to stripe waveguide 3 of the beam forming means. It follows from geometry of reflectors 10 and 11 and equation (13) that this structure is capable of performing the through-passage of a wideband optical signal. Actually, directivity patterns of the forming and selecting elements, when the light wavelength varies, perform scanning synchronously, and the angle therebetween practically does not change. Thus, if orientation of reflectors 11 of stripe waveguide 7 is selected such that its directivity pattern at the operating light wavelength is parallel to directivity pattern of the forming element, then a significant portion of the optical beam energy (up to 50%) will transit from the forming element to the selecting element at all wavelengths across a sufficiently great area (over 60 nm) of the operating wavelength.

However, the through-passage of a wideband optical signal (through function) from input waveguide 9 to waveguide 21 at output of the device is carried out for all wavelengths, except for those that were deflected using the acoustic wave. It is noted that waveguide 12 can be used for passage of a wideband optical signal (out-function), but the better the device is designed (losses are less), the lesser is the intensity (in general, less than 10%) of the light that reaches waveguide 12. A portion of the deflected light beams, at the predetermined wavelengths, will be filtered, and via stripe waveguides 4–6 they will be conveyed to fiber-optic waveguides 19 (functions drop 1, drop2 and drop3) by the corresponding selecting elements. However, it is desirable that all remaining (non-filtered) wavelengths would also be permitted to pass through the device. To that end, the acousto-optical filter is equipped with additional transducer 20 of acoustic waves, which transducer is suited to generate the acoustic wave directed opposite to the acoustic wave of main transducer 16 and capable of interacting with the beam light waves within the interval between the last and next to last stripe waveguides 7 and 6 of the selection means. I.e., immediately upstream of stripe optical waveguide 7 of the selecting element that performs the passage (through) function, the second acoustic wave propagates; Bragg angle for the diffracted wave from the a first acoustic cell coincides with Bragg angle for the incident wave for a second acoustic cell (FIG. 3). In other words, if the mirror-reflected light beams were outputted from the selecting means' stripe waveguide, they would be directed at Bragg angle for the diffracted light wave of a second acousto-optical cell (FIG. 3) Owing to additional transducer 20 of the acoustic waves, the optical beam that comprises all non-filtered wavelengths, will be diffracted at the second acoustic wave, will deviate in the reverse direction (as compared with diffraction at the first acoustic wave) and can be efficiently outputted from the device using the selecting element on stripe waveguide 7 that performs the function of through-passage of the wideband optical signal (through). Besides, the second acoustic wave will compensate for the additional Doppler shift of the light frequency, for both transducer's 16 and 20 of the acoustic waves are able to operate on the same frequency.

Further discussed is the particular case when the mirror-reflected light beams of the forming and/or selecting elements are directed at zero Bragg angle (are collinear). According to behaviour of curve 31 (FIG. 6), according to the invention, the device performs the function of the optical multi-channel filter capable of electronic tuning of the operating light wavelength of each of the channels within the existing possibilities of changing the refractive index $\delta N/N = \delta\lambda/\lambda$ by the external alternating or direct electric field.

The acousto-optical tunable filter according to the invention has minimal dimensions (in our example: the operating field is less than 1 cm), a narrow passband line (about 0.1 nm at the level of 3 dB, and 0.22 nm at the level of −20 dB) within the tuning band up to 60 nm, and an high level of suppression (over 30 dB) of the parasitic signals outside the filter passband.

INDUSTRIAL APPLICABILITY

The proposed acousto-optical tunable filter can be suitably used in the field of designing the dense wavelength-division multiplexing (DWDM) systems used in fiber-optic communication, as well as for small-size tunable spectrometers of optical radiation, for example for remote sensing devices—transducers for sensing composition of gases, liquids and solid bodies.

The acousto-optical tunable filter can be manufactured by the known methods developed for the integrated optics and microelectronics devices. Any transparent solid body for which has been developed methods for manufacture of optical waveguides with low losses (less than, or about 1 dB/cm) and for efficient excitation of the acoustic waves, can be used as the material for manufacture of this device. To such material belong: lithium niobate and tantalate, semiconductor heteroepitaxial structures $A_{III}B_V$, dielectric layered structures comprising a piezoelectric layer for excitation of SAW, for example $ZnO/SiO_2/Si$, etc. The case that is the most simple and can be technically implemented with a comparative easiness is a device based on optical waveguides made of lithium niobate that has good optical, acousto-optical and electro-optical properties.

The invention claimed is:

1. An acousto-optical tunable filter, comprising:
   a planar optical waveguide (2) for propagation of light beam (14), and
   arranged sequentially along the path of the light radiation—means for forming a light beam,
   transducer (16) for acoustic waves suited to generate an acoustic wave (15) that is capable of interacting with the light beam waves to cause their diffraction within a predetermined wavelength range, and
   means for selecting a diffracted portion of the light beam, characterized in that
   at least one of the light beam forming means and selecting means is in the form of at least one stripe waveguide (3) disposed in a plane of the planar waveguide (2), within said waveguide itself, or in the vicinity thereof, and in the form of a multiple unit reflectors (10) that overlap an aperture of stripe waveguide (3), the relative position and inclination angle of said unit reflectors being selected to maintain a phase difference at the operating radiation wavelength for any pair of beams (13) reflected from different unit reflectors (10), where said phase difference is essentially a multiple of $2\pi$.

2. The acousto-optical filter as claimed in claim 1, characterized in that both the forming means and selecting means are in the form of stripe waveguides (3 and 4), unit reflectors (10) of the beam forming means' stripe waveguide are inclined in the direction that is opposite to inclination of unit reflectors (10) of the selecting means.

3. The acousto-optical filter as claimed in claim 2, characterized in that the selecting means comprises a plurality of analogous stripe waveguides (4–7), the arrangement and inclination angle of unit reflectors (11) of each of said waveguides being chosen such that a predetermined wavelength is selected unique to a particular waveguide.

4. The acousto-optical filter as claimed in claim 3, characterized in that the stripe waveguide (7), that is the last on the radiation path, is implemented as identical to stripe waveguide (3) of the beam forming means.

5. The acousto-optical filter as claimed in claim 4, characterized in that said filter is provided with additional transducer (20) of acoustic waves, which transducer is suited to generate the acoustic wave that is directed opposite to the acoustic wave of main transducer (16) and capable of interacting with the beam light waves within the interval between the last and next to last stripe waveguides (6 and 7) of the selecting means.

6. The acousto-optical filter as claimed in claim 1, characterized in that the inclination angle of the unit reflectors (3–7) is about 45 degrees with respect to axis of the corresponding stripe waveguide.

7. The acousto-optical filter as claimed in claim 1, characterized in that unit reflectors (10,11) have different reflectance whose value decreases from the middle portion of a stripe waveguide to its ends.

8. The acousto-optical filter as claimed in claim 1, characterized in that unit reflectors (10, 11) are disposed at different intervals from one another.

9. The acousto-optical filter as claimed in claim 1, characterized in that along at least one stripe waveguide (5), electrode (23) is positioned, ends of which electrode being connected to controlled source (25) of alternating or direct current.

10. The acousto-optical filter as claimed in claim 1, characterized in that along at least one stripe waveguide (6) disposed is a pair of electrodes (22) connected to controlled source (24) of direct current.

* * * * *